A. G. DAVIS.
ELECTRODE.
APPLICATION FILED JULY 29, 1904.
905,666.
Patented Dec. 1, 1908.
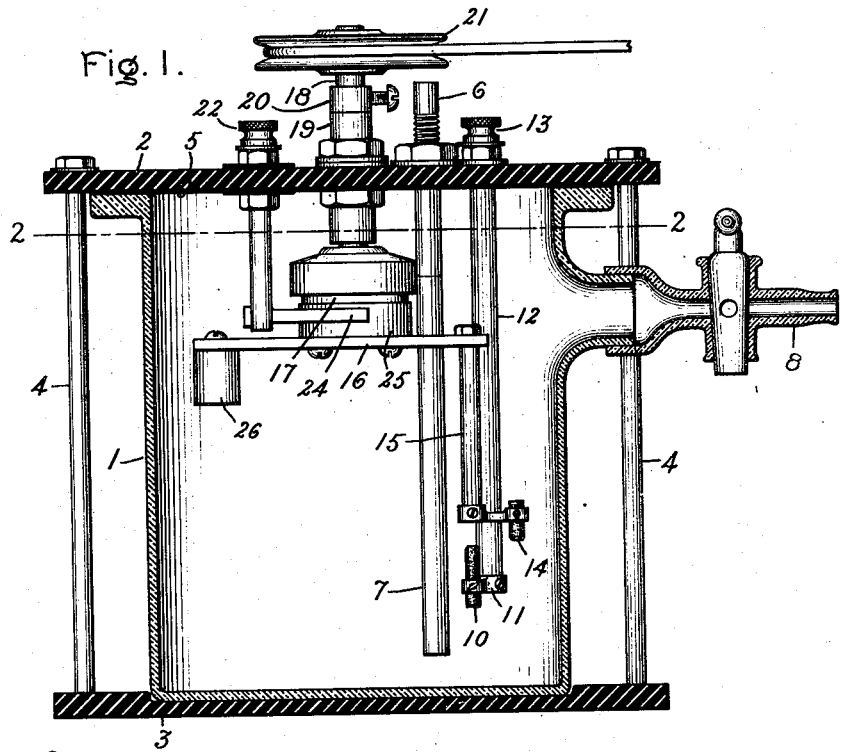
Fig. 1.
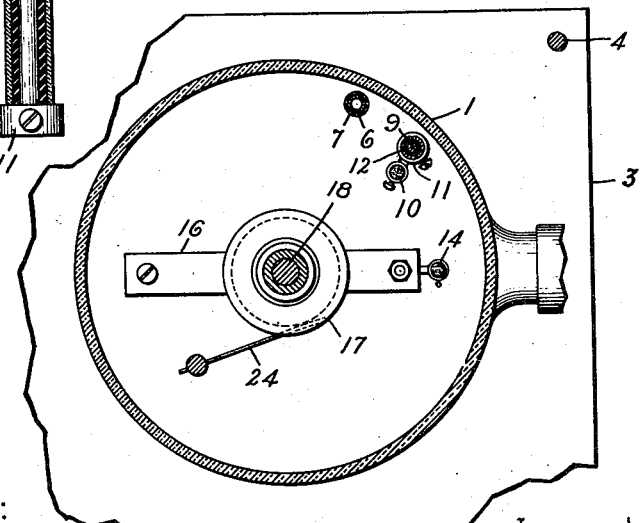
Fig. 3.
Fig. 2.
Witnesses:
George W. Tilden.
Helen Alford
Inventor:
Albert G. Davis

UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

ELECTRODE.

No. 905,666.  Specification of Letters Patent.  Patented Dec. 1, 1908.

Application filed July 29, 1904. Serial No. 218,603.

*To all whom it may concern:*

Be it known that I, ALBERT G. DAVIS, a citizen of the United States, residing at Schenectady, county of Schenectady, State of New York, have invented certain new and useful Improvements in Electrodes, of which the following is a specification.

This invention consists of an improvement in electrodes for apparatus in which gases are subjected to treatment with an electrical discharge or arc.

In the manufacture and synthesis of various gaseous products an electrical discharge between suitable electrodes is utilized to produce certain chemical reactions.

The electrodes between which the electrical discharge passes are subjected to severe working conditions as they must withstand not only the destructive action of the arc but also the corrosive action of the gases operated upon. Aside from this there are other factors which make certain substances particularly suitable for use as electrodes. It has been found that some compounds are more active than others in the catalysis of chemical reactions, and it is therefore desirable in selecting a substance to serve as electrodes to choose one which favors catalysis, as many of the reactions occurring in apparatus of this class are based in part on this action.

The present invention has for its object an electrode which properly withstands the destructive actions of the arc, which favors catalysis, and which is in other respects well adapted to serve as an electrode. This electrode contains iron and is therefore well adapted to produce catalytic action because of the activity of iron and iron compounds in general in the catalysis of chemical reactions, and I prefer to use iron combined with oxygen in the form of an oxid of iron such as $Fe_3O_4$, which yields a long arc and is otherwise well adapted for use as an electrode. This oxid, known as magnetite, occurs widely distributed in nature. It is hard and possesses good mechanical strength and wearing qualities, and it crystallizes in regular octahedra. In this condition it may be used as electrodes, or it may be pulverized, mixed with a suitable binder such as water glass and molded into the desired form. Electrodes of this oxid give a long brilliant arc and are particularly effective in promoting chemical changes in the gases treated. In the manufacture of atmospheric products such as the oxids of nitrogen these electrodes are substantially unattacked by the nitric acid and appear to promote in a marked degree the formation of the oxids. These electrodes may be used in various forms of apparatus and the simple cell shown in the drawing illustrates only one type of apparatus to which they are adapted.

Figure 1 is a sectional elevation of a cell arranged for the production of atmospheric products; Fig. 2 is a cross-section on the line 2 2 of Fig. 1 with some of the parts broken away; and Fig. 3 is a detail view of the two electrodes.

The glass jar 1 is tightly clamped between the fiber plates 2 3 by the brass rods 4. The top of the jar is provided with an annular washer 5 of elastic material to insure an air tight inclosure within the jar. A brass tube 6 passes through the top plate 2 and carries at its lower end a glass tube 7 for conducting the gas to be treated to the bottom of the jar. The tube 8 serves as a means for drawing off the gases after treatment by the arc. The brass rod 9 is securely clamped to the fiber top and serves as a support for the lower electrode 10 which is connected thereto by holder 11. The rod 9 is protected from the arc by a glass tube 12 and is provided with a binding post 13 at its top to connect the lower electrode with the source of electrical energy. The upper electrode 14 is carried by a rod 15 supported by the arm 16. This arm is rigidly secured to the insulating cap 17 which in turn is carried rigidly on the shaft 18. The shaft is supported in a bearing 19 by the adjustable collar 20 and may be rapidly rotated by means of the pulley 21. This rotation of the shaft causes a similar rotation of the upper electrode 14. Electrical connection is made with the upper electrode through the binding post 22, spring brush 24 and slip ring 25, the latter being in contact with the arm 16. A counterweight 26 equalizes the weight of the upper electrode and its support. When the upper electrode is rapidly revolved the momentary contact of the two electrodes serves to establish an arc which is drawn out as the electrodes separate and which is finally extinguished when the arcing distance becomes too great. Actual contact of the electrodes is however not essential, for with a sufficiently high voltage the current will jump the intervening air gap and establish the arc. By thus avoiding actual contact of the electrodes mechanical wear of the contact surface is avoided. In the manufacture of oxids of nitrogen the gases to be treated are forced down the tube 7 into the lower part of the jar 1 where they come in contact with the arc formed between the electrodes and where the nitrogen and oxygen unite to form the desired products.

What I claim as new and desire to secure by Letters Patent of the United States, is:

1. In an apparatus for the electrical treatment of gases, an electrode containing iron chemically combined with another element, a coöperating electrode, and means for delivering to said electrodes a gas to be treated.

2. In an apparatus for the electrical treatment of gases, an electrode of iron oxid, a coöperating electrode, and means for delivering to said electrodes a gas to be treated.

3. In an apparatus for the electrical treatment of gases, an electrode of magnetite, a coöperating electrode, and means for delivering to said electrodes a gas to be treated.

4. In an apparatus for the electrical treatment of gases, electrodes containing magnetite in substantial percentage, and means for establishing an arc between said electrodes.

5. In combination, in an apparatus for the production of chemical changes in gases or vapor, an electrode yielding a long arc by virtue of its content of an iron compound, and means for springing an arc from said electrode.

6. In an apparatus for the electrical treatment of gases, an electrode yielding a long arc by virtue of its content of iron chemically combined with another element, a coöperating electrode, and means for delivering to said electrodes a gas to be treated.

7. In an apparatus for the electrical treatment of gases, an electrode consisting of a conductive compound of iron with a non-metallic element, a coöperating electrode, and means for delivering to said electrodes a gas to be treated.

In witness whereof I have hereunto set my hand this 28th day of July, 1904.

ALBERT G. DAVIS.

Witnesses:
BENJAMIN B. HULL,
HELEN ORFORD.